United States Patent
Fang et al.

(10) Patent No.: US 10,676,952 B2
(45) Date of Patent: Jun. 9, 2020

(54) SYSTEM AND METHOD FOR STABILIZING A WIND TURBINE

(71) Applicant: General Electric Company, Schenectady, NY (US)

(72) Inventors: Biao Fang, Clifton Park, NY (US); Srikrishna Mantravadi, Enschede (NL); Nikolina Kourteva Kristeva, Greenville, SC (US); Ingo Paura, Meppen (DE); Norman Arnold Turnquist, Carlisle, NY (US); Todd DarVel Andersen, Heber City, UT (US); Pascal Meyer, Burnt Hills, NY (US); Gregory Edward Cooper, Greenfield Center, NY (US); James Henry Madge, Simpsonville, SC (US)

(73) Assignee: General Electric Company, Schenectady, NY (US)

(*) Notice: Subject to any disclaimer, the term of this patent is extended or adjusted under 35 U.S.C. 154(b) by 0 days.

(21) Appl. No.: 15/881,158

(22) Filed: Jan. 26, 2018

(65) Prior Publication Data
US 2019/0234096 A1    Aug. 1, 2019

(51) Int. Cl.
*E04H 12/20* (2006.01)
*F03D 13/20* (2016.01)

(52) U.S. Cl.
CPC ............ *E04H 12/20* (2013.01); *F03D 13/20* (2016.05); *F05B 2230/60* (2013.01); *F05B 2240/912* (2013.01); *F05B 2240/917* (2013.01)

(58) Field of Classification Search
CPC .... E04H 12/20; F03D 13/20; F05B 2240/912; F05B 2230/06; F16G 11/00
See application file for complete search history.

(56) References Cited

U.S. PATENT DOCUMENTS

| 5,182,458 A | 1/1993 | McConachy |
| 6,800,956 B2 | 10/2004 | Bartlett |

(Continued)

FOREIGN PATENT DOCUMENTS

| CN | 205811899 | 12/2016 |
| CN | 106321367 A | 1/2017 |

(Continued)

OTHER PUBLICATIONS

Leo Goldstein, "A proposal and a theoretical analysis of a novel concept of a tilted-axis wind turbine", Energy, vol. 84, pp. 247-254, May 1, 2015.

(Continued)

*Primary Examiner* — Patrick J Maestri
(74) *Attorney, Agent, or Firm* — Mary Louise Stanford

(57) ABSTRACT

A wind turbine system includes a wind turbine generator having a rotor and a nacelle mounted atop a tower structure. The tower structure is mounted to a foundation structure and includes a plurality of tower sections, each including one or more tower section flanges. The wind turbine system further includes one or more connector rings. Each of the one or more connector rings is disposed proximate two adjacent tower section flanges and includes a plurality of pad eye adaptors each having an opening formed therein. The wind turbine system further includes a plurality of tensioned cables, with each coupled to one of the pad eye adaptors at a first end and the foundation structure at a second end. The plurality of tensioned cables are coupled to the tower structure at different or multiple connector ring heights based on site conditions to yield the desired lateral stability.

23 Claims, 14 Drawing Sheets

(56) References Cited

U.S. PATENT DOCUMENTS

| | | |
|---|---|---|
| 7,059,095 B1 | 6/2006 | Stevens et al. |
| 7,508,088 B2 | 3/2009 | Kothnur et al. |
| 8,007,236 B2 | 8/2011 | Sherman et al. |
| 8,146,219 B2 | 4/2012 | Monostory |
| 8,474,219 B2 | 7/2013 | Lambert |
| 8,667,766 B2 | 3/2014 | Lambert |
| 9,032,674 B2 | 5/2015 | Schibsbye |
| 9,458,642 B2 | 10/2016 | Lambert |
| 9,580,925 B2 | 2/2017 | Heikkinen |
| 2012/0260590 A1 | 10/2012 | Lambert |
| 2013/0164134 A1 | 6/2013 | Goldstein |
| 2014/0041314 A1* | 2/2014 | Amir ................ E04H 12/10 52/8 |
| 2014/0286778 A1 | 9/2014 | Moestrup |
| 2015/0259044 A1 | 9/2015 | Lopez et al. |
| 2015/0308139 A1 | 10/2015 | Wagner |
| 2016/0215761 A1 | 7/2016 | Rohden |
| 2016/0215762 A1 | 7/2016 | Rohden |
| 2016/0369779 A1 | 12/2016 | Lambert |
| 2017/0292283 A1* | 10/2017 | Drewes ................ E04H 12/10 |
| 2018/0003158 A1* | 1/2018 | Pedersen ............... E04H 12/20 |

FOREIGN PATENT DOCUMENTS

| | | |
|---|---|---|
| DE | 102012021697 A | 2/2014 |
| DE | 102014100814 A1 | 3/2015 |
| EP | 2711485 A1 | 3/2014 |
| EP | 2673505 A1 | 10/2015 |
| ES | 2369304 A1 | 11/2011 |
| IN | 200905385 P1 | 4/2010 |
| IN | 201304145 I4 | 6/2016 |
| KR | 101240722 B1 | 3/2013 |
| KR | 101528510 B1 | 6/2015 |
| WO | 2015171347 A1 | 11/2015 |

OTHER PUBLICATIONS

Search Report and Written Opinion from corresponding PCT Application No. PCT/US2018/064464 dated Apr. 30, 2019.

* cited by examiner

SYSTEM AND METHOD FOR STABILIZING A WIND TURBINE

BACKGROUND

The present invention relates generally to wind turbines, and in particular to techniques for stabilizing towers of wind turbines in both new and retrofit applications.

Wind turbines are generally regarded as an environmentally safe and a desirable source of renewable energy. In summary, a wind turbine harnesses the kinetic energy of wind and transforms this kinetic energy into electrical energy. Thus, electrical power can be generated with virtually zero emissions, unlike existing natural gas-fired or coal-fired power generation technologies. To maximize the efficacy of power generation and to simplify connection to a power grid, several wind turbines are often located in proximity to one another in what are generally referred to in the pertinent art as "wind farms." Advantageously, these wind farms are located in regions having relatively strong winds.

Many wind turbines are rapidly approaching the end of their design life. With new wind technology development in recent years, upgrading or replacing old wind turbines with newer ones can potentially raise yield by a factor of two or more. Currently "repowering" old wind fleets is a vital and growing business among major turbine manufacturers. These new technologies include the use of larger turbines or the location of hubs at higher positions, if wind conditions allow, thus enabling an increase in annual energy production (AEP).

The overall structural design of the tower and foundation structure of a wind turbine is determined by the size of the turbine, the dynamic wind loads wider various turbine operational modes and by extreme loads imposed during high wind speed conditions (during which the turbine may or may not be operational). To minimize fatigue loading, the stiffness of the tower and foundation structure should be desirably sized such that the overall natural frequency of the wind turbine/foundation system is outside the frequency range of excitation due to the rotor operation and the dynamic wind loading. A typical industry practice is to size the stiffness of the tower and foundation structure such that the overall system natural frequency is higher than the excitation from the rotor revolution but lower than the excitation from the blade passing the wind turbine tower. At greater heights (>120 m) found in advanced wind technologies, standard tubular towers are not cost effective. Even if larger towers were to become available, the feasibility of such is limited due to the limited availability and increasing expense of larger foundation structures. The tower and foundation thus becomes a limiting factor in upgrading to a larger turbine. Replacing the entire tower and foundation structure requires significant cost and time. Accordingly, advanced tower designs for both new and retrofit applications are necessary to advance wind technology and reduce cost.

Guy wire or cable stabilized towers have long been a proven technology for static applications (antenna masts, bridges, etc.). Traditionally, the cables were used for small wind turbines. Only recently have they found their way into the large utility wind turbine market. By attaching cables to the tower structure, the additional bending moment from a larger turbine is offset by the cable tension forces. From an attachment point of the cable and downward, the bending moment is significantly reduced. The moment acting on the foundation structure is also reduced. Connector technologies link the guy wire to the tower and transfer operating loads efficiently from the tower to the cables. Existing designs use cable and cable connectors which are either welded or bolted to the outside or inside of the tower shell/flange. In other designs, connectors fastened to the inside of the tower shell require the cable to penetrate the shell. This design creates stress concentrations around the perimeter of the opening, increasing complexity of the design. Welded and bolted connections are typically more difficult to design for fatigue life.

Therefore, there is a need to design a system and method for stabilizing a wind turbine that will provide the necessary offset for increased bending loads for larger turbines, at increased tower heights and higher winds. There is also a need for a more robust design of a connector that is not only cost effective, but has an increased fatigue life, and provides for ease in manufacture and assembly.

BRIEF DESCRIPTION

Aspects and advantages of the present disclosure will be set forth in part in the following description, or may be obvious from the description, or may be learned through practice of the disclosure. Briefly, in accordance with one aspect of the present technique, a wind turbine system is provided. The wind turbine system includes a wind turbine generator comprising a tower structure mounted on a foundation structure, one or more connector rings and a plurality of tensioned cables. The tower structure includes a plurality of tower sections. Each of the plurality of tower sections includes one or more tower section flanges. Each of the one or more connector rings is disposed proximate two adjacent tower section flanges. Each of the one or more connector rings includes a plurality of pad eye adaptors having an opening formed therein. Each of the plurality of tensioned cables is coupled to one of the pad eye adaptors at a first end and the foundation structure at a second end.

In accordance with another aspect, a wind turbine system is provided. The wind turbine system includes a wind turbine generator comprising a tower structure mounted on a foundation structure, one or more connector rings, a plurality of tensioned cables and at least one knee member. The tower structure includes a plurality of tower sections, each including one or more tower section flanges. Each of the one or more connector rings is disposed proximate two adjacent tower section flanges. Each of the one or more connector rings includes a plurality of pad eye adaptors having an opening formed therein. Each of the one or more connector rings comprises one of a non-segmented connector ring and a segmented connector ring. Each of the plurality of tensioned cables is coupled to one of the plurality of pad eye adaptors at a first end and to the foundation structure at a second end. The plurality of tensioned cables are coupled to the at least one knee member and to one of the plurality of pad eye adaptors at a connection point above the at least one knee member.

In accordance with yet another aspect, a method of stabilizing a wind turbine system is provided. The method includes mounting a tower structure on a foundation structure, securing a plurality of tensioned cables and mounting a wind turbine generator upon the tower structure. The tower structure includes a plurality of tower sections, with each of the plurality of tower sections including one or more tower section flanges. The plurality of tensioned cables are secured to one or more connector rings disposed proximate two adjacent tower section flanges and to the foundation structure. Each of the one or more connector rings includes a plurality of pad eye adaptors having an opening formed therein.

DRAWINGS

These and other features of this disclosure will be more readily understood from the following detailed description of the various aspects of the disclosure taken in conjunction with the accompanying drawings that depict various embodiments of the disclosure in which like characters represent like parts throughout the drawings, wherein.

Figure 17:
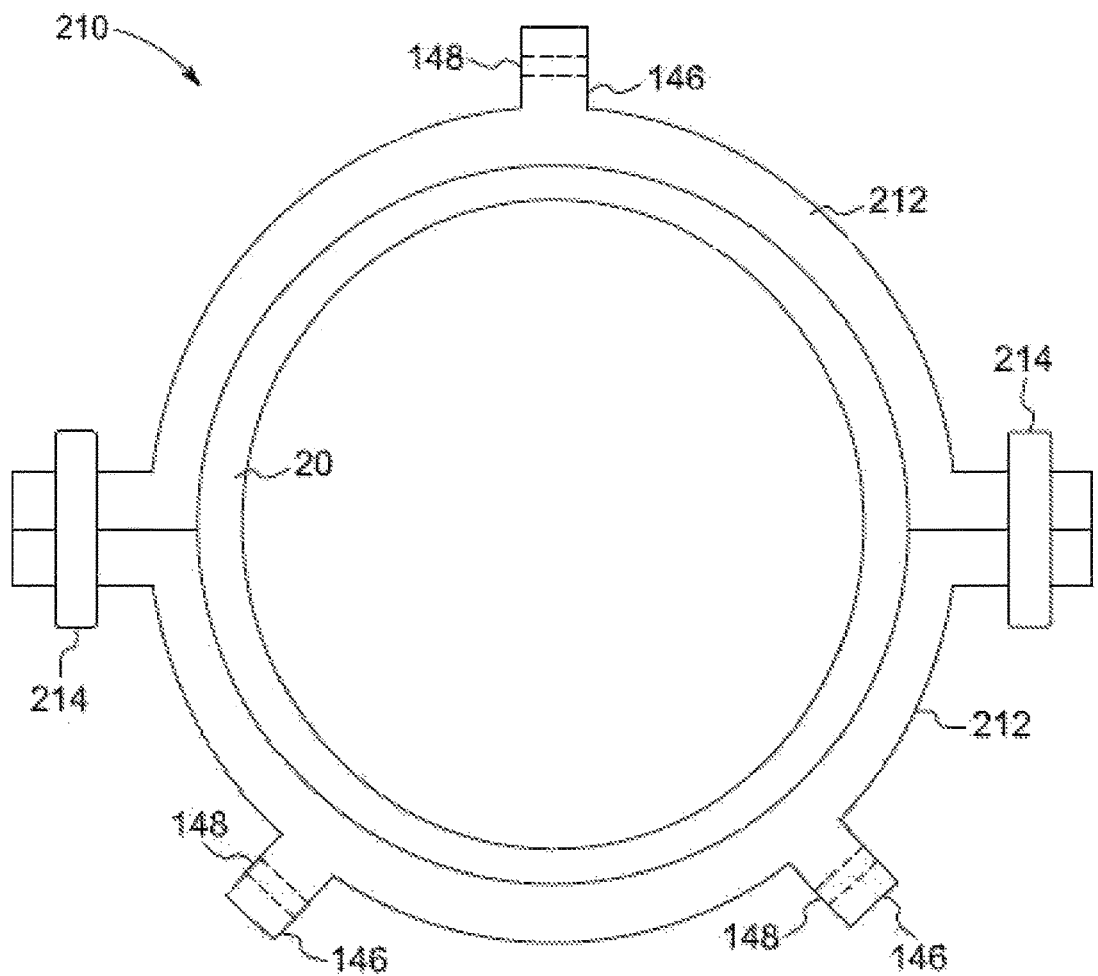
Figure 18:
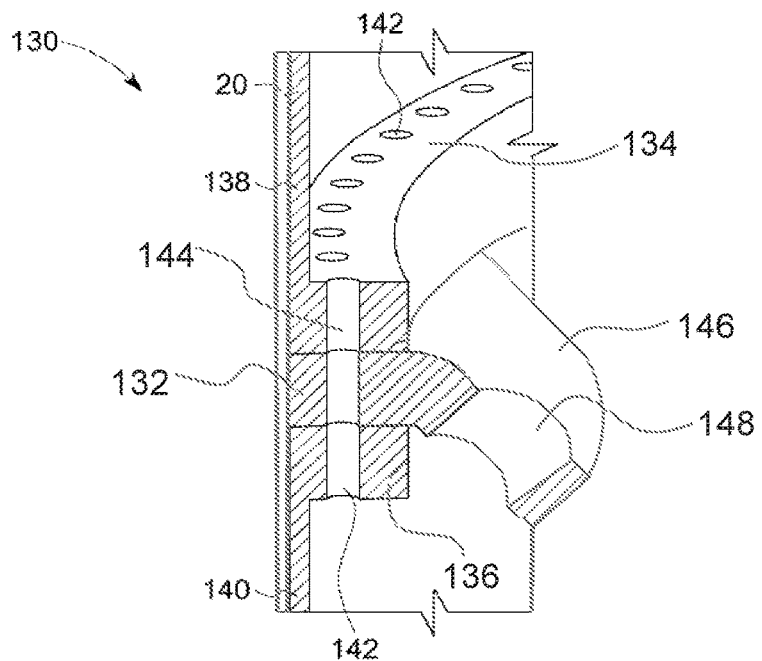

FIG. 17 is a diagrammatic illustration of an embodiment of a segmented connector ring for use in the wind turbine system disclosed herein, in accordance with one or more embodiments shown or described herein; and FIG. 18 is a diagrammatic illustration of another embodiment of a non-segmented connector ring for use in the wind turbine system disclosed herein, in accordance with one or more embodiments shown or described herein.

Unless otherwise indicated, the drawings provided herein are meant to illustrate features of embodiments of this disclosure. These features are believed to be applicable in a wide variety of systems comprising one or more embodiments of this disclosure. As such, the drawings are not meant to include all conventional features known by those of ordinary skill in the art to be required for the practice of the embodiments disclosed herein.

It is noted that the drawings as presented herein are not necessarily to scale. The drawings are intended to depict only typical aspects of the disclosed embodiments, and therefore should not be considered as limiting the scope of the disclosure. Repeat use of reference characters in the present specification and drawings is intended to represent the same or analogous features or elements of the present disclosure.

DETAILED DESCRIPTION

Reference now will be made in detail to embodiments of the disclosure, one or more examples of which are illustrated in the drawings. Each example is provided by way of explanation of the disclosure, not limitation of the disclosure. In fact, it will be apparent to those skilled in the art that various modifications and variations can be made in the present disclosure without departing from the scope or spirit of the invention. For instance, features illustrated or described as part of one embodiment can be used with another embodiment to yield a still further embodiment. Thus, it is intended that the present disclosure covers such modifications and variations as come within the scope of the appended claims and their equivalents.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Approximating language, as used herein throughout the specification and claims, is applied to modify any quantitative representation that could permissibly vary without resulting in a change in the basic function to which it is related. Unless otherwise indicated, approximating language, such as "generally," "substantially," and "about," as used herein indicates that the term so modified may apply to only an approximate degree, as would be recognized by one of ordinary skill in the art, rather than to an absolute or perfect degree. Accordingly, a value modified by such term is not to be limited to the precise value specified. In at least some instances, the approximating language may correspond to the precision of an instrument for measuring the value. Here and throughout the specification and claims, range limitations are combined and interchanged. Such ranges are identified and include all the sub-ranges contained therein unless context or language indicates otherwise.

The stabilizing system described below provides a novel approach toward stabilizing a superstructure, such as a wind turbine tower, by incorporating one or more connector rings disposed between one or more tower section flanges having coupled thereto one or more taut or tensioned cables. The overall lateral shear and overturning moment from the wind turbine are translated to varying tensile loads in the taut cables. With varying loads, the connector rings and the cables are configured to provide the required stiffness and the load carrying capacity. Embodiments of the present technique are described hereinafter referring generally to FIG. 1-16.

Turning now to the drawings, FIGS. 1-7 illustrate various configurations for the tensioned cables for stabilizing the wind turbine tower, described herein. In each of the embodiments of FIGS. 1-7, illustrated is a wind turbine system in accordance with exemplary embodiments of the present technique. Each of the wind turbine systems includes a wind turbine generator 12 comprising a rotor 14 having multiple blades 16. Various electrical and mechanical components of the wind turbine generator 12, such as the drive train, electrical generator, etc are housed in a nacelle 18. In each embodiment, the rotor 16 and the nacelle 18 are mounted atop a tower 20 that exposes the blades 16 to the wind. The blades 16 transform the kinetic energy of the wind into a rotation motion of a shaft that drives a generator (not shown) to produce electrical power.

The tower structure 20, the nacelle 18 and the rotor 14 are mounted on a foundation structure 21 in the illustrated embodiments, the tower 20 is secured to the foundation structure 22. The tower structure 20 is a cylindrical column, extending from the foundation structure 22 to a height '$h_1$' above the foundation structure 22. The tower structure 20 is configured to support the dead weight of the nacelle 18 and rotor 14, axial (vertical direction) loads resulting due to the tension in the cables (pre-tension during installation as well as the varying tensile loads during wind turbine operation) and overturning moments due to wind loading. In accordance with one embodiment of the present technique, this combined lateral loading and overturning moment on the tower structure 20 is mitigated by the use of a plurality of taut or tensioned cables 30, referred to herein simply as tensioned cables 30. These tensioned cables 30 are configured to secure the wind turbine system at a first end 32 to the tower structure 20 via a connector ring 34 (described presently). The tensioned cables 30 are further configured to secure the wind turbine system at a second end 36 to the foundation structure 22, and ultimately a ground surface 38, via an array of connectors 40. In one embodiment, these connectors 40 could be located in a symmetric circular array around tower structure 20. In certain embodiments, the actual location of the connectors 40 may be determined based on the need to enhance the structural stiffness and load carrying capacity in certain directions. The connectors 40 are adapted to transfer the load from the tensioned cables 30 to the foundation structure 22.

The tensioned cables 30 are flexibly connected via the first end 32 to the connector ring 34 and via the second end 36 to the connectors 40. In the context of this discussion, a "flexible" connection is one that permits relative rotation of the cables 30 with respect to the connector ring 34 and the connectors 40 at the respective points of interconnection, thereby reducing fatigue and stress concentration at these joints. In effect, the "flexible" connections described in greater detail below are adapted to translate the lateral loads and overturning moments on the tower structure 20 into axial loads on the cables 30. The cables 30 may be formed, for example, from steel rope, synthetic polyester, among others and are typically between 3-5 inches in diameter. In the illustrated embodiment, the cables 30 are designed with sockets 42 and 44 at either end. The illustrated sockets 42 and 44 are formed, for example, from cast steel pieces, and are of a conical shape with two parallel flanges which receive connecting pins 46 and 48. At the first end 32 of each of the tensioned cables 30, the connecting pin 46 connects the top socket 42 to the connector ring 34. At the second end 36 of the tensioned cable 30, the connecting pin 48 connects the bottom socket 44 to the connectors 40 of the foundation structure 22. The use of pinned connections allows for small rotations of the cables 30 and thereby minimizes the stress concentration at both junctions. Those skilled in the art will realize that several other commonly used cable termination designs can be while simultaneously minimizing the effect of stress concentrations, and are anticipated herein.

In the illustrated embodiments of FIGS. 1-7, each cable 30 may further include an in-line tensioning device 50 to adjust the tension in the cable 30 and provide the appropriate lateral stability and foundation stiffness necessary at the installation site. Interconnections between the cable 30 and tensioning device 50 may be through additional sockets (not shown), which may either be flanged or welded onto the tensioning device directly. In one embodiment, the tensioning device 36 consists of a threaded U-bolt with load nuts that can be tightened to increase tension in the cable 30. Various other in-line cable tensioning devices can be utilized as will be appreciated by those skilled in the art. The tensioning device 50 advantageously facilitates adjustments in the tension of the cables to facilitate rapid installation of the foundation structure. In addition, the tension in the cables 30 can be periodically adjusted to correct for effects of creep and relaxation and maintain an adequate margin of safety at all times.

The cables 30 may be set to an initial pre-strain condition via the tensioning device 50 during installation of the wind turbine system. In certain embodiments, the tension in the cables 30 may be relaxed during maintenance operations for easier access to site, and re-tensioned before the wind turbine resumes operation. The tensioned cables 30 may further be advantageously used to secure the wind turbine nacelle/tower top prior to an extreme weather event such as with wind speeds outside of the initial design intent. In certain embodiments, redundant cables may be used to anchor the caisson or tower such that the wind turbine remains operational in a stable regime when one of the cables fails due to unforeseen events, such as, for example, ship impacts.

As best illustrated in FIGS. 1-7, the wind turbine assembly further includes one or more knee members 52, oriented horizontal, relative to the tower structure 20. The one or more knee members 52 provide additional connection locations of the tensioned cables 30 proximate the tower structure 20. The one or more knee members 52 may be comprised of individual component parts, truss structures or complete rings disposed about the tower structure 20. In an embodiment, the one or more knee members 52 are welded to the tower structure 20. In another embodiment, the one or more knee members 52 are disposed between adjacent tower section flanges (described presently) clamped between tower flanges.

Figure 1:
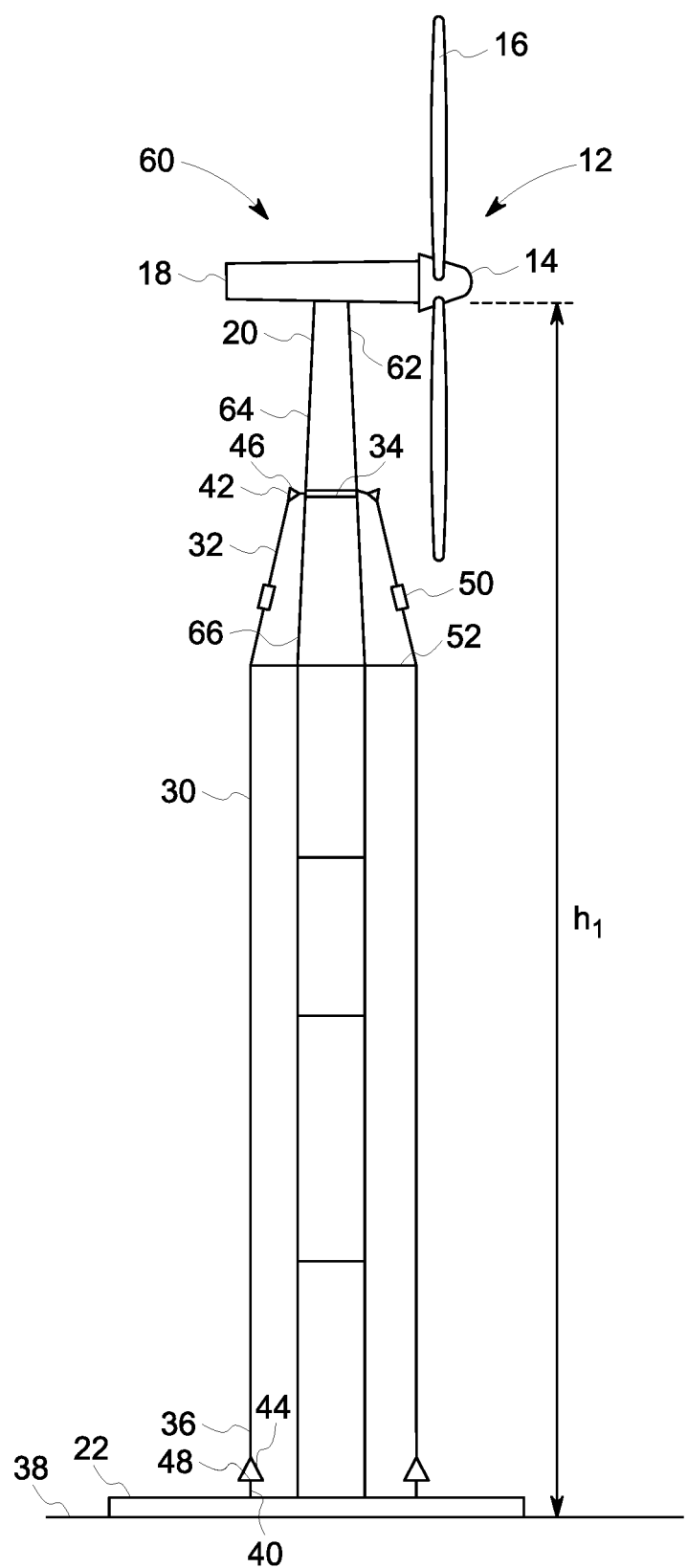
FIG. 1 is a diagrammatic illustration of a wind turbine system, in accordance with one or more embodiments shown or described herein.

The varying configurations of each embodiment of FIGS. 1-7 will now be described. Referring more specifically to FIG. 1, illustrated in a side elevational view is a first embodiment of a wind turbine system 60. In the embodiment of FIG. 1, the connector ring 34 is disposed between adjacent tower sections proximate a tip end 62 of the tower structure 20. More specifically, in this particular embodiment, the connector ring 34 is disposed between a first tower structure section 64 and a second tower structure section 66. Each of the first and second tower structure sections 64, 66 include a flange (described presently). The connector ring 34 is disposed between the two adjacent tower section flanges, and more particularly a first tower structure section flange and a second tower structure section flange. Further, the embodiment of FIG. 1 includes a knee member 52, disposed between the connector ring 34 and the foundation structure 22. Each of the tensioned cables 30 is coupled to the connector ring 34 (described presently), the knee member 52 and a connector 40. In this particular embodiment, by configuring the tensioned cable 30, connector ring 34 and knee member 52 as described, an overall footprint (i.e. foundation structure 22) of the wind turbine system 60 may remain at a minimum, such as required in many wind farm instances, or the like. As illustrated, the inclusion of the knee member 52 provides the cables 30 a point at which they become oriented parallel to the tower structure 20, between the knee member 52 and the foundation structure 22.

The point of interconnection of the tensioned cables 30 and the tower structure 20 may be as high as feasible on the particular site of installation based on navigational and aesthetic reasons, yet also positioned to maintain a safe distance with the passage of the rotating blades 16. In the illustrated embodiment of FIG. 1, the cables are interconnected proximate the tip end 62 of the tower structure 20. The tensioning devices 50 may be advantageously disposed above or below the knee member 52 to facilitate easy and remote adjustment of the tension in the cables 30 based on site conditions. In the illustrated embodiment the tensioning device 50 is positioned above the knee member 52.

Figure 2:
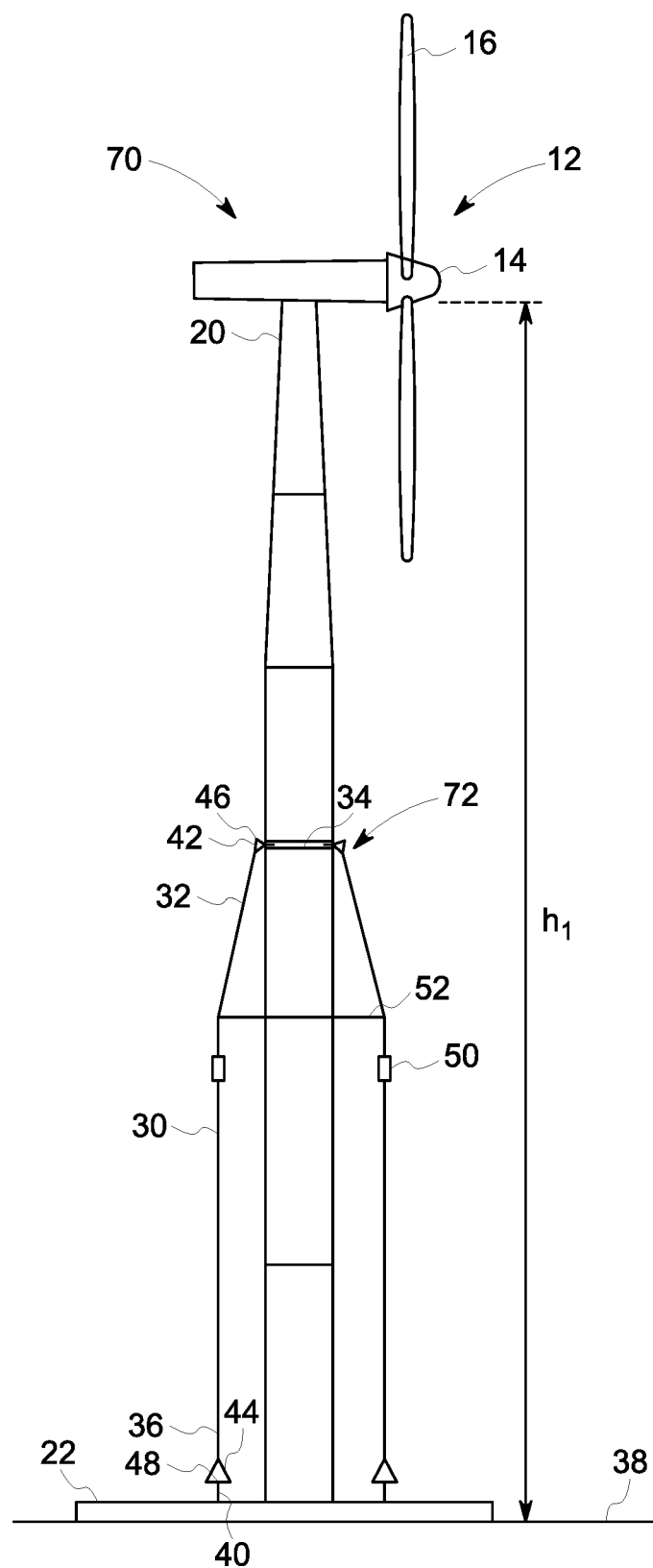
FIG. 2 is a diagrammatic illustration of a wind turbine system, in accordance with one or more embodiments shown or described herein.

FIG. 2 illustrates in a side elevational view another embodiment of a wind turbine system 70 wherein the taut cables 30 may also be attached at other intermediate heights, such as proximate a mid-point 72 of the tower structure 20. As previously described with respect to FIG. 1, the connector ring 34 is disposed between adjacent tower sections of the tower structure 20. More specifically, in this particular embodiment, the connector ring 34 is disposed between adjacent tower structure sections proximate the mid-point 72 of the overall height $h_1$ of the tower structure 20. As previously described, the connector ring 34 is disposed between the two adjacent tower section flanges. Similar to the embodiment of FIG. 1, the wind tower system 70 of FIG. 2 includes a knee member 52, disposed between the connector ring 34 and the foundation structure 22. Each of the tensioned cables 30 is coupled to the connector ring 34 (described presently), the knee member 52 and a connector 40. In this particular embodiment, by configuring the tensioned cable 30, connector ring 34 and knee member 52 as described, an overall footprint (i.e. foundation structure 22) of the wind turbine system 70 may remain at a minimum, such as required in many wind farm instances, or the like. Similar to the embodiment of FIG. 1, the inclusion of the knee member 52 provides the cables 30 a point at which they become oriented parallel to the tower structure 20, between the knee member 52 and the foundation structure 22.

In the illustrated embodiment of FIG. 2, the tensioning devices 50 may be advantageously disposed above or below the knee member 52 to facilitate easy and remote adjustment of the tension in the cables 30 based on site conditions. In the illustrated embodiment the tensioning device 50 is positioned below the knee member 52.

Figure 3:
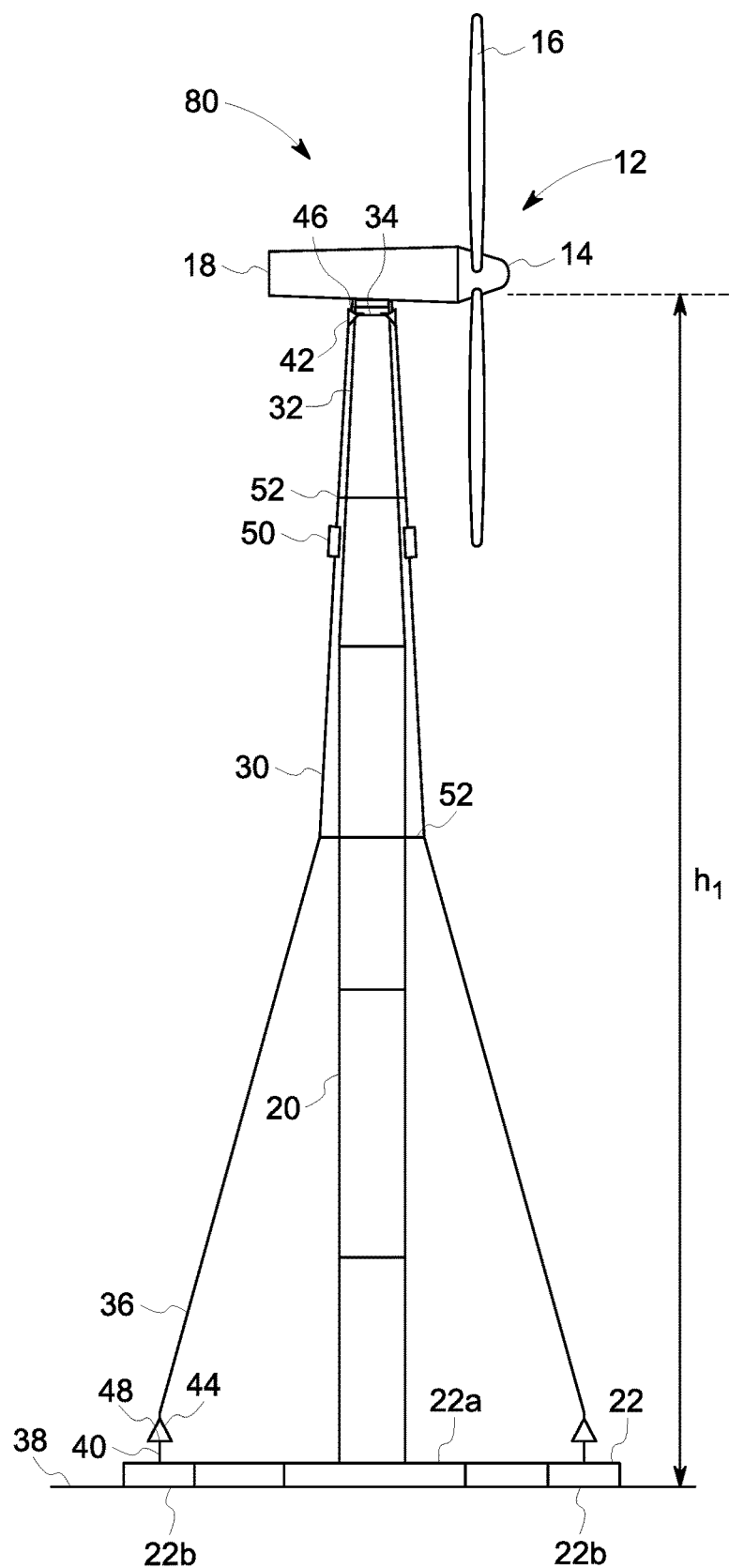
FIG. 3 is a diagrammatic illustration of a wind turbine system, in accordance with one or more embodiments shown or described herein.
Figure 4:
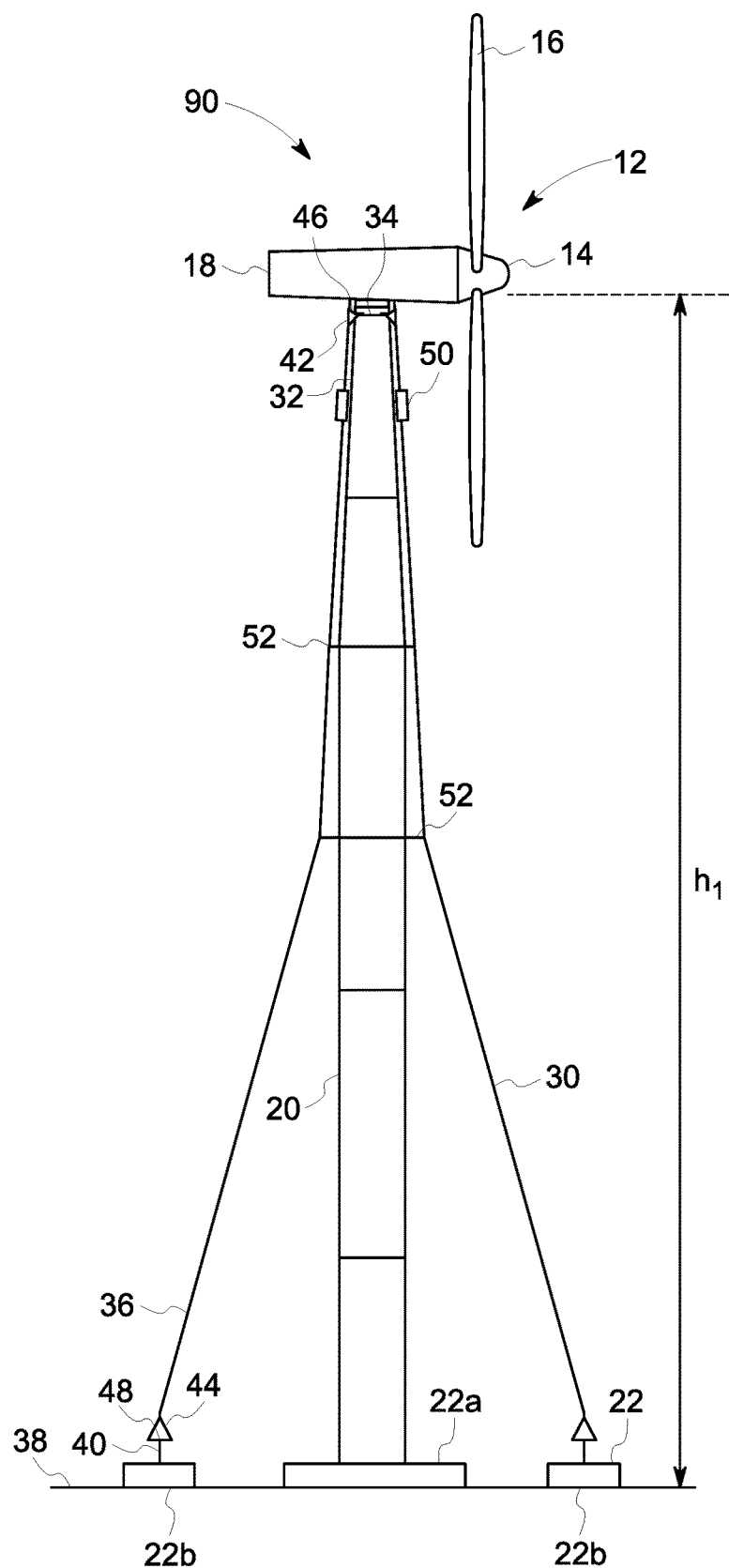
FIG. 4 is a diagrammatic illustration of a wind turbine system, in accordance with one or more embodiments shown or described herein.

Referring now to FIGS. 3 and 4, illustrated in side elevational views are additional configurations of a wind turbine system, generally referenced 80, 90, respectively, according to this disclosure. In each of the embodiments of FIGS. 3 and 4, the wind turbine system 80, 90 is configured in generally the same manner as in FIGS. 1 and 2, with respect to the inclusion of the connector ring 34 and knee members 52. In contrast to the embodiments of FIGS. 1 and 2, in the wind turbine system 80, 90 of FIGS. 3 and 4, multiple knee members 52 are included for coupling thereto the tensioned cables 30 and illustrate various locations along the tower structure 20 for the plurality of knee members 52. Furthermore, in contrast to the embodiments of FIGS. 1 and 2, the inclusion of the knee member 52 provides the cables 30 a point of connection, yet the tensioned cables 30, as illustrated, are not required to be oriented parallel to the tower structure 20, between the knee member 52 and the foundation structure 22. As best illustrated in FIGS. 3 and 4, in an embodiment where the tensioned cables 30 are coupled to the foundation structure 22 with larger angles, the foundation structure 22 may also be separated into two or more sections. More specifically, in the embodiments of FIGS. 3 and 4, the foundation structure 22 is comprised of a central foundation structure 22a to which the tower structure 20 is coupled, and a one or more individual foundation pads 22b. As best illustrated in FIG. 3, in an embodiment, the plurality of tensioned cables 30 may be coupled to a single foundation structure pad 22b formed about the central foundation structure 22a. As best illustrated in FIG. 4, in an embodiment, the foundation structure 22 may be comprised of a plurality of individually formed foundation structure pads 22b formed about the central foundation structure 22a, and to which each individual tensioned cable 30 is coupled to a respective foundation structure pad 22b.

Figure 5:
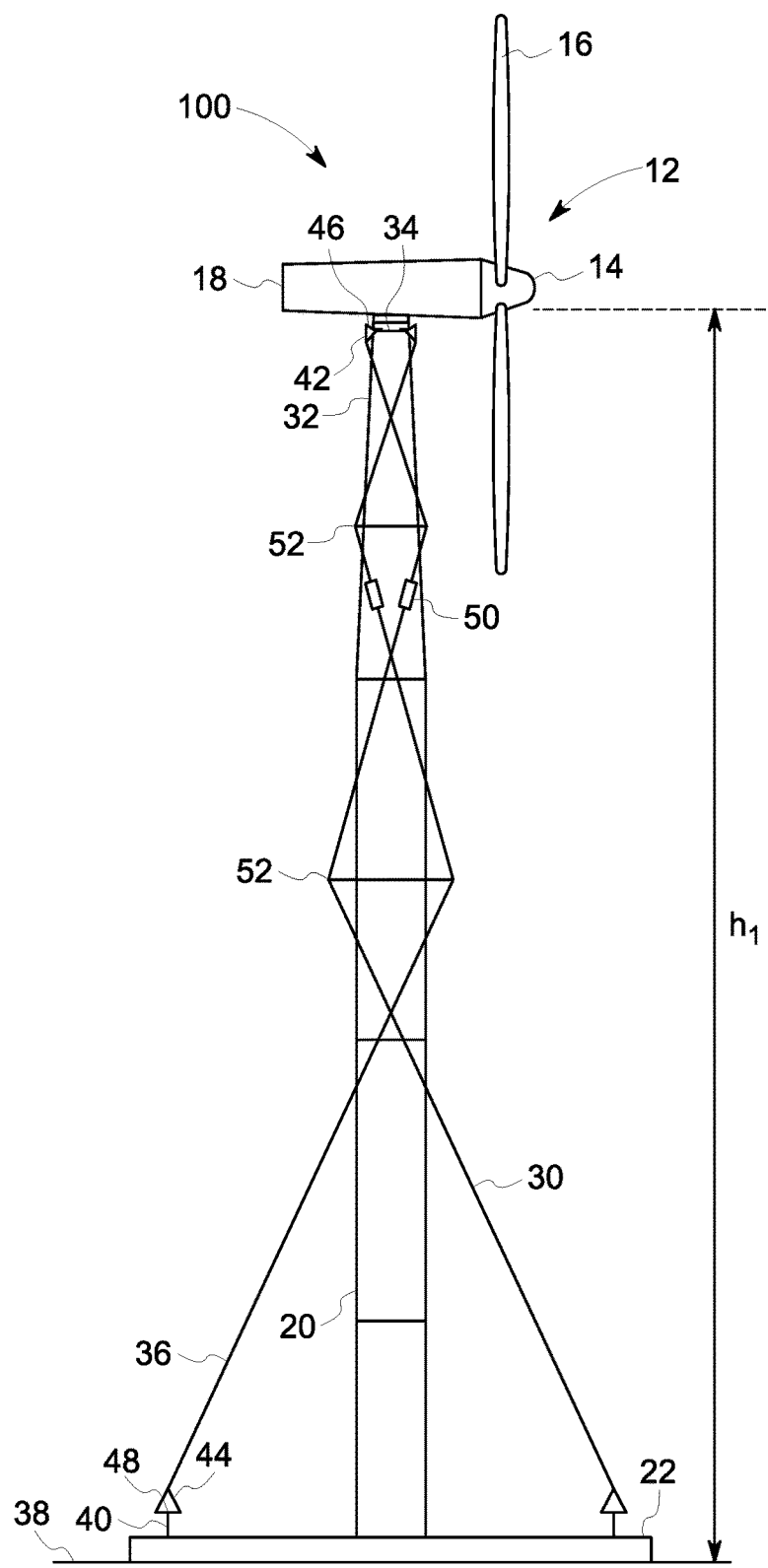
FIG. 5 is a diagrammatic illustration of a wind turbine system, in accordance with one or more embodiments shown or described herein.
Figure 6:
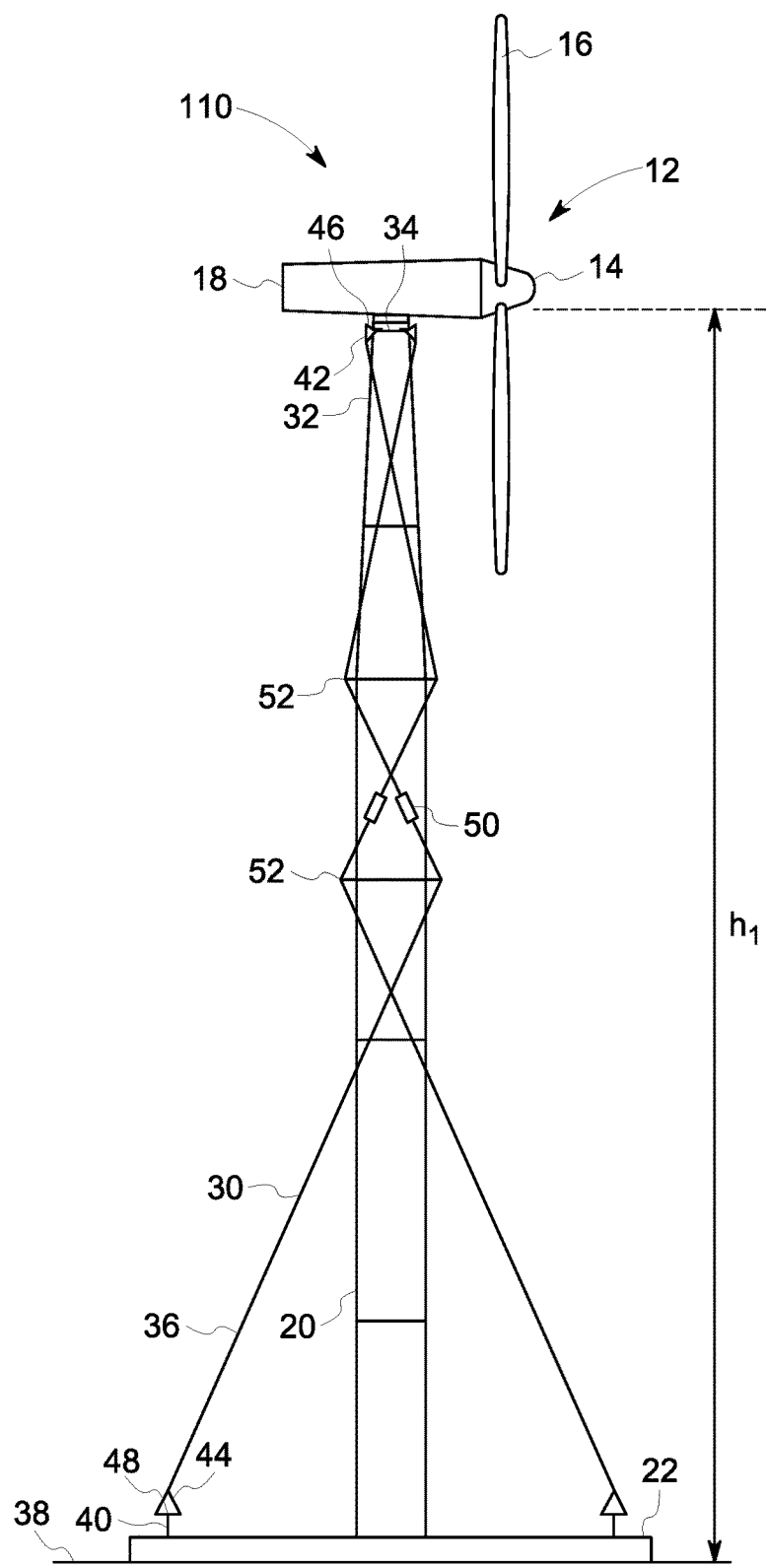
FIG. 6 is a diagrammatic illustration of a wind turbine system, in accordance with one or more embodiments shown or described herein.

Referring now to FIGS. 5 and 6, illustrated in side elevational views are additional configurations of a wind turbine system, generally referenced 100, 110, respectively, according to this disclosure. In each of the embodiments of FIGS. 5 and 6, the wind turbine system 100, 110 is configured in generally the same manner as in FIGS. 3 and 4, with respect to the inclusion of the connector ring 34 and multiple knee members 52 positioned at various locations along the tower structure 20. In contrast to the embodiments of FIGS. 1-4, in the wind turbine systems 100, 110 of FIGS. 5 and 6, the tensioned cables 30 are configured in a crossed-cable configuration. The crossed-cabled configuration of the tensioned cables 30 provides additional torsional stiffness to the overall structure. As illustrated, the crossed tensioned cables 30 may be coupled to the connector ring 34 and one or more knees 52 positioned at various locations along the tower structure 20.

Figure 7:
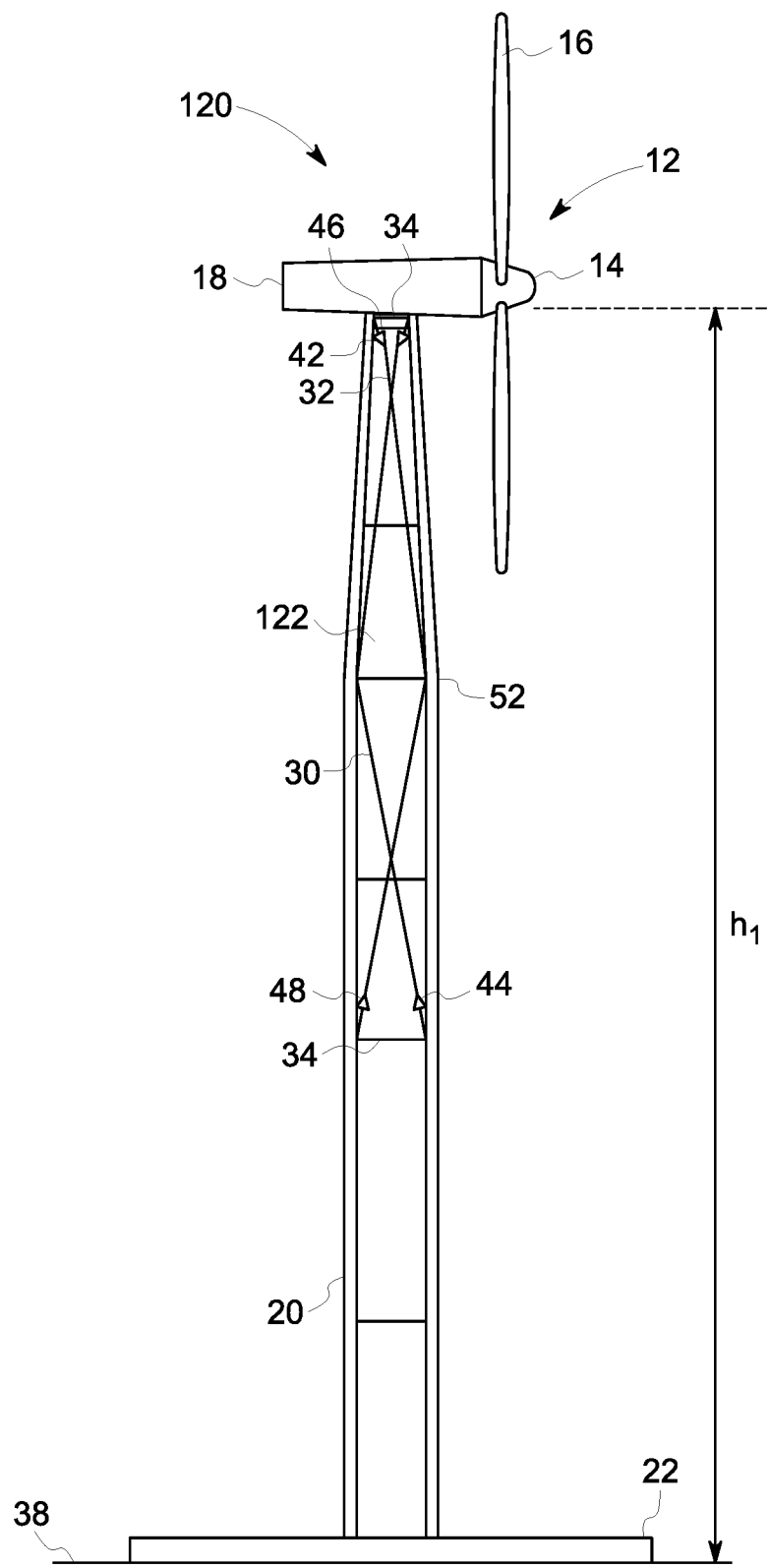
FIG. 7 is a diagrammatic illustration of a wind turbine system, in accordance with one or more embodiments shown or described herein.

FIG. 7 illustrates in a cross-sectional view, another configuration of a wind turbine system, generally referenced 120, according to this disclosure. In this particular embodiment the wind turbine system 120 is configured in generally the same cross-cabled configuration as in FIGS. 5 and 6, and with respect to the inclusion of the connector ring 34 and multiple knee members 52 positioned at various locations along the tower structure 20. In contrast to the embodiments of FIGS. 1-6, in the wind turbine system 120 of FIG. 7, the tensioned cables 30 are configured in an interior space 122 defined within the tower structure 20, and more particularly within each tower structure section. Similar to the embodiments of FIGS. 5 and 6, the crossed-cable configuration of the tensioned cables 30 provides additional torsional stiffness to the overall structure. As illustrated, the crossed tensioned cables 30 may be coupled to the connector ring 34 and one or more knees 52 positioned at various locations along the interior space 122 of the tower structure 20.

Figure 8:
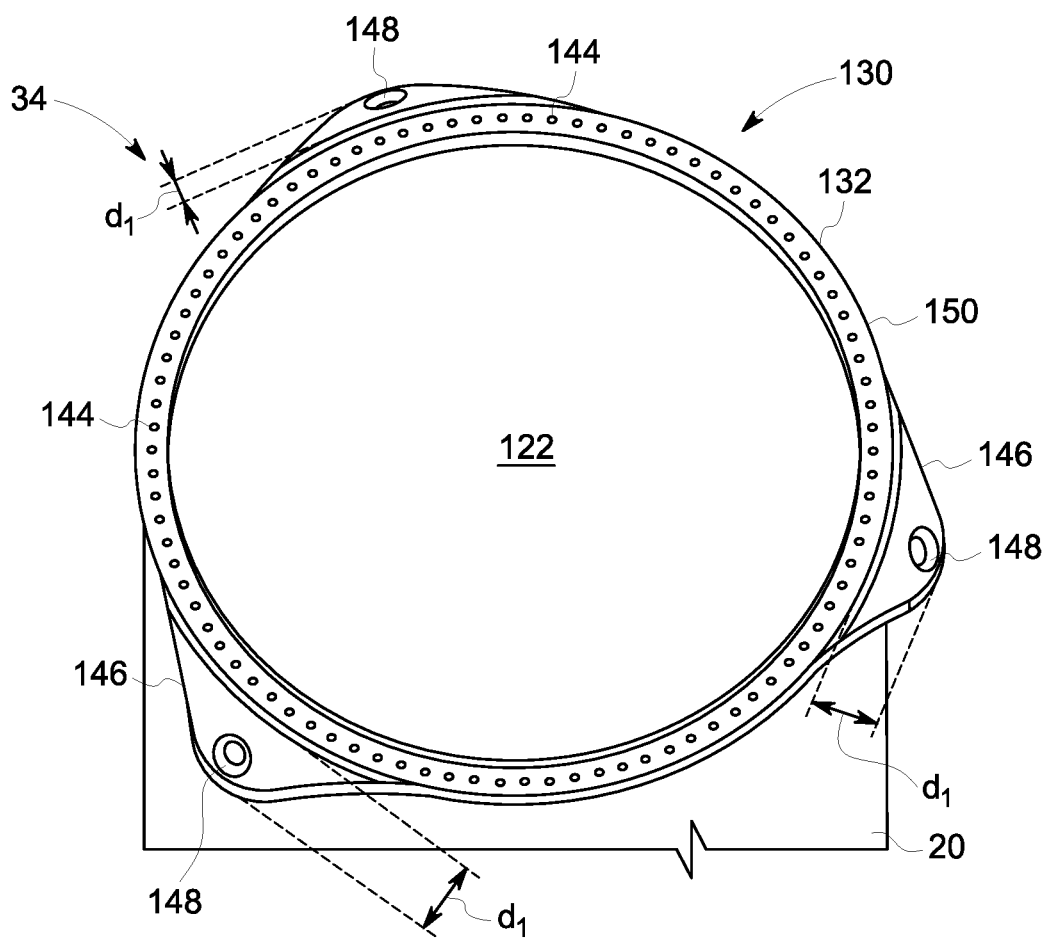
FIG. 8 is a diagrammatic illustration of an embodiment of a non-segmented connector ring for use in the wind turbine system disclosed herein, in accordance with one or more embodiments shown or described herein.
Figure 9:
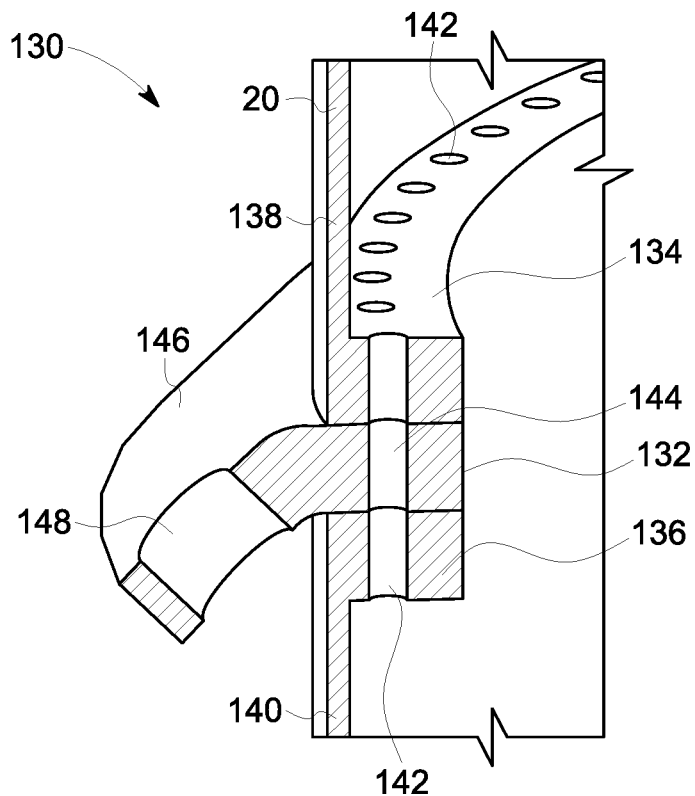
FIG. 9 is a diagrammatic illustration of an embodiment of a pad eye adaptor as a part of the non-segmented connector ring of FIG. 8, in accordance with one or more embodiments shown or described herein.

In each of the embodiments of FIGS. 1-7, the tensioned cables 30 are coupled to at least one connector ring 34. FIGS. 8-18 are provided as embodiments that may be employed in any of the previously described cable configurations for securing the tensioned cable 30 to the connector ring 34. As previously noted, like elements have like numbers throughout the embodiments. Each of the connector rings described herein may be formed by casting, machining, or the like. Referring more specifically to FIG. 8, illustrated is an embodiment of a connector ring 130, generally similar to connector ring 34, for use in any of the previously described embodiments of FIGS. 1-6. In the embodiment of FIGS. 8 and 9, the connector ring 130 is non-segmented. More particularly, the connector ring 130 is formed as a continuous ring 132 for disposing between adjacent flanges of the tower structure sections of the tower structure 20, as best described with regard to FIGS. 1 and 2. As best illustrated in FIG. 9, in an embodiment, the connector ring 130 is disposed between adjacent flanges 134, 136 of each of a tower structure section 138, 140, respectively, each having a plurality of openings 142 formed therein. In this particular embodiment, the connector ring 130 includes a plurality of openings 144 formed thereabout and cooperatively aligned with the openings 142 formed in the flanges 134, 136. To provide for coupling of the connector ring 130 to the flanges 134, 136 of the tower structure 20, a bolt (not shown) or similar coupling component is disposed therein the openings 142 and 144.

The connector ring 130 includes a plurality pad eye adaptors 146 (of which only one is illustrated), each having an opening 148 formed therein. Each of the pad eye adaptors 146 is configured extending a distance "$d_1$" from an outer perimeter 150 of the continuous ring 132. In an alternate embodiment, for use in the interior located tensioned cables 30 as described in FIG. 7, the plurality of pad eye adaptors 146 may be formed extending into the interior space 122 (FIG. 7) of the connector ring, as illustrated in FIG. 18. In the embodiment of FIGS. 8 and 9, the pad eye adaptors 146 are configured in a downwardly angled configuration, wherein the plurality of openings 148 are horizontally oriented, and referred to herein as a mushroom type adaptor, but it is noted, the geometry of the connector ring 130 is design dependent relative to the coupling of the tensioned cables 30 therein the openings 148.

Figure 10:
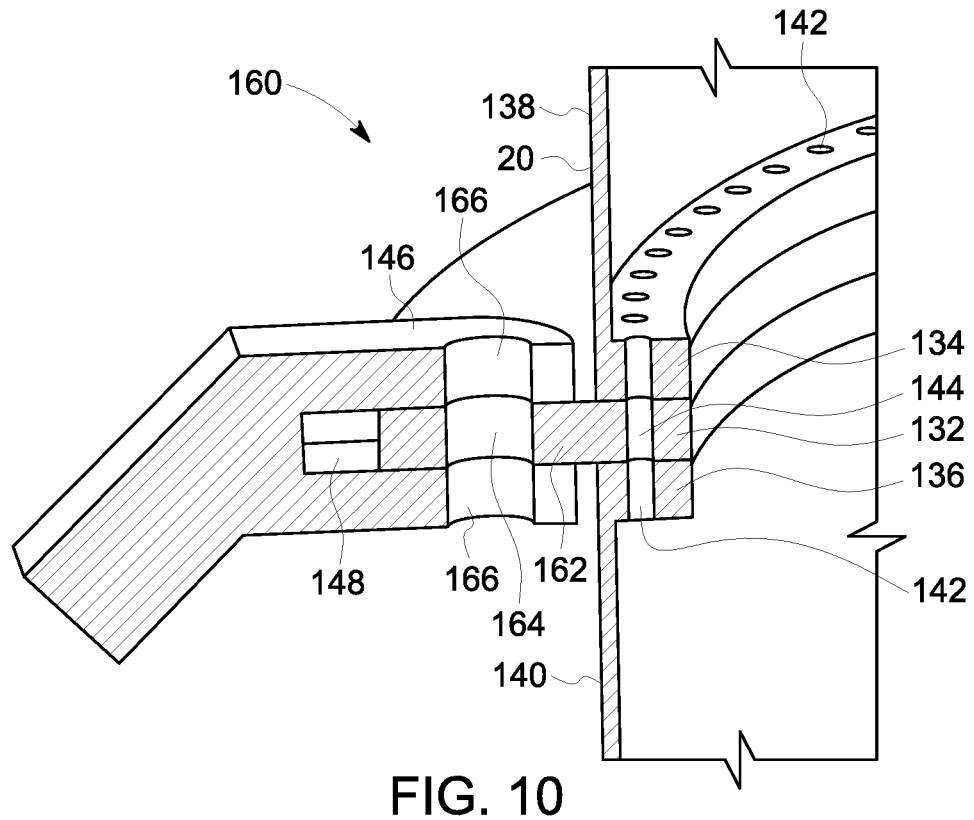
FIG. 10 is a diagrammatic illustration of another embodiment of a pad eye adaptor as a part of a non-segmented connector ring, in accordance with one or more embodiments shown or described herein.

Referring now to FIG. 10, illustrated is another embodiment of a connector ring, generally similar to connector ring 34 of FIGS. 1-7. In this particular embodiment, illustrated is a connector ring 160. Similar to the embodiment of FIGS. 8 and 9, the connector ring 160 is non-segmented and comprised of a continuous ring 132 disposed between adjacent flanges of the tower structure sections of the tower structure 20, as best described with regard to FIGS. 1 and 2. More specifically, and as best illustrated in FIG. 10, in an embodiment, the connector ring 160 is disposed between adjacent flanges 134, 136 of each of a tower structure section 138, 140, respectively, each having a plurality of openings 142 formed therein. In this particular embodiment, the connector ring 160 is configured to include the continuous ring 132, including an extended portion 162 that extends beyond an outer perimeter of the tower structure 20, and having a plurality of openings 164 formed therein. The connector ring 160 includes a plurality of openings 144 formed thereabout and cooperatively aligned with the openings 142 formed in the flanges 134, 136. To provide for coupling of the connector ring 160 to the flanges 134, 136 of the tower structure 20, a bolt (not shown) or similar coupling component is disposed therein the openings 142 and 144.

The connector ring 160 includes plurality of pad eye adaptors 146 (of which only one is illustrated), each having an opening 148 formed therein. In contrast to the embodiment of FIGS. 8 and 9, in this particular embodiment the pad eye adaptors 146 are configured having an essentially straight geometry. In addition, in contrast to the embodiment of FIGS. 8 and 9, in this particular embodiment the pad eye adaptors 146 are configured as separate components that are coupled to the extended portion 162 of the continuous ring 132. To achieve such coupling, each of the pad eye adaptors 146 includes one or more coupling openings 166, cooperatively aligned with the openings 164 formed in the extended portion 162 of the continuous ring 132. A bolt (not shown) or similar coupling component is disposed therein the openings 164 and 166. In the embodiment of FIG. 10, the pad eye adaptors 146 are configured downwardly angled, but it is noted are design dependent relative to the coupling of the tensioned cables 30 therein the openings 148. In addition, in contrast to the embodiment of FIGS. 8 and 9, the opening 148 defined therein the pad eye adaptors 146 are configured as vertical openings.

Figure 11:
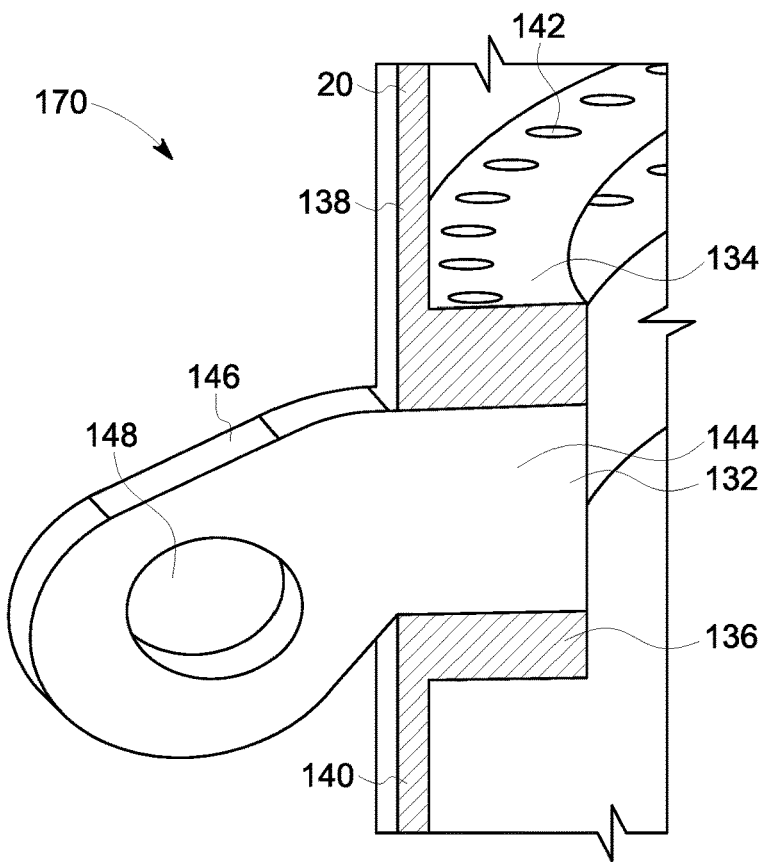
FIG. 11 is a diagrammatic illustration of another embodiment of a pad eye adaptor as a part of a non-segmented connector ring, in accordance with one or more embodiments shown or described herein.
Figure 12:
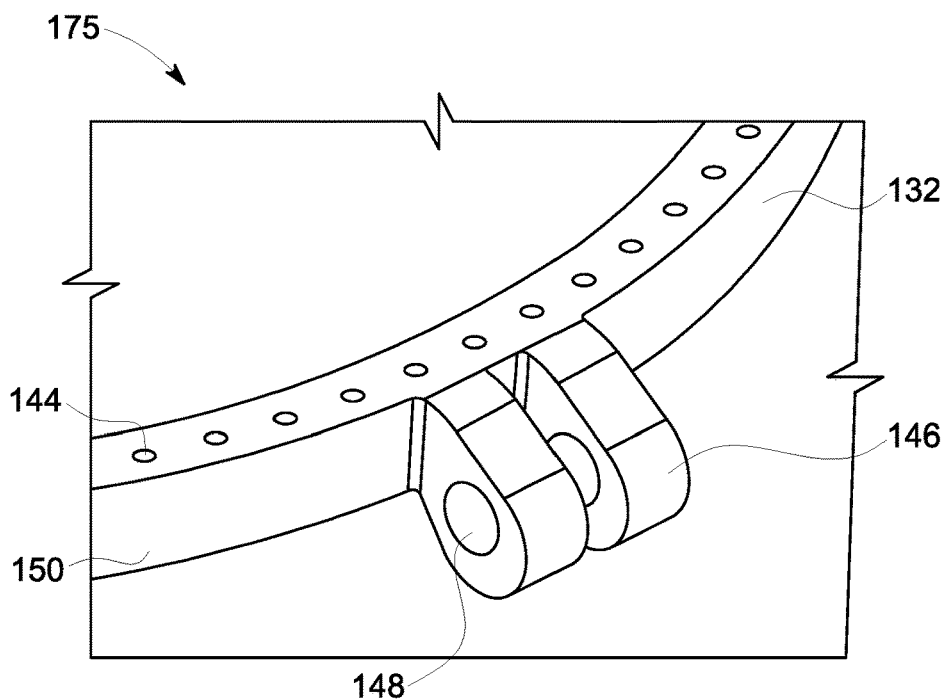
FIG. 12 is a diagrammatic illustration of another embodiment of a pad eye adaptor as a part of a non-segmented connector ring, in accordance with one or more embodiments shown or described herein.

Referring now to FIGS. 11 and 12, illustrated are connector rings, referenced 170 and 175 wherein like elements to those of the embodiments of FIGS. 8 and 9 are referenced with like numbers. In contrast to the previous embodiments, the pad eye adaptors 146 are configured having a teardrop geometry, and more specifically a single teardrop geometry as best illustrated in FIG. 11 and a double teardrop geometry as best illustrated in FIG. 12. In the embodiment of FIG. 11, illustrated is the connector ring 170 including the plurality of pad eye adaptors 146 (of which only one is illustrated), wherein the pad eye adaptors 146 are equally spaced about the connector ring 170. In the embodiment of FIG. 12, illustrated is the connector ring 175 including a plurality of pairs of pad eye adaptors 146, wherein each pair of pad eye adaptors 146 is equally spaced about the connector ring 175 and referred to herein as having a double teardrop geometry.

Figure 13:
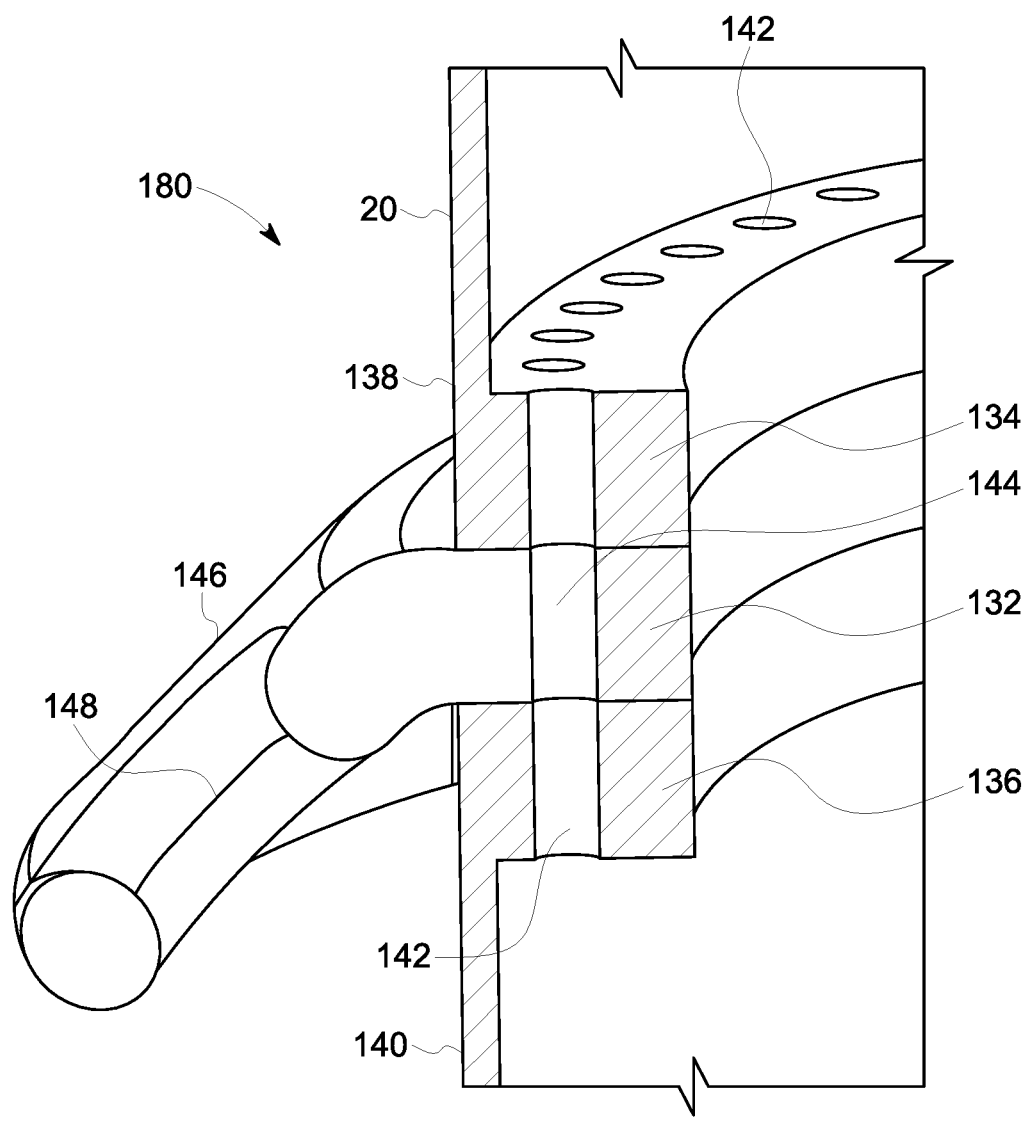
FIG. 13 is a diagrammatic illustration of another embodiment of a pad eye adaptor as a part of a non-segmented connector ring, in accordance with one or more embodiments shown or described herein.

Referring now to FIG. 13, illustrated is a connector ring, referenced 180 Wherein like elements to those of the embodiments of FIGS. 8 and 9 are referenced with like numbers. In contrast to the previous embodiments, the pad eye adaptors 146 are configured having a donut ring geometry. In the embodiment of FIG. 13, illustrated is the connector ring 180 including a plurality of pad eye adaptors 146 (of which only one is illustrated), wherein the pad eye adaptors 146 are equally spaced about the connector ring 180. In the embodiment of FIG. 13, illustrated is the connector ring 180, wherein each pad eye adaptor 146 is referred to herein as having a ring-type geometry including a horizontally configured opening 148.

Figure 14:
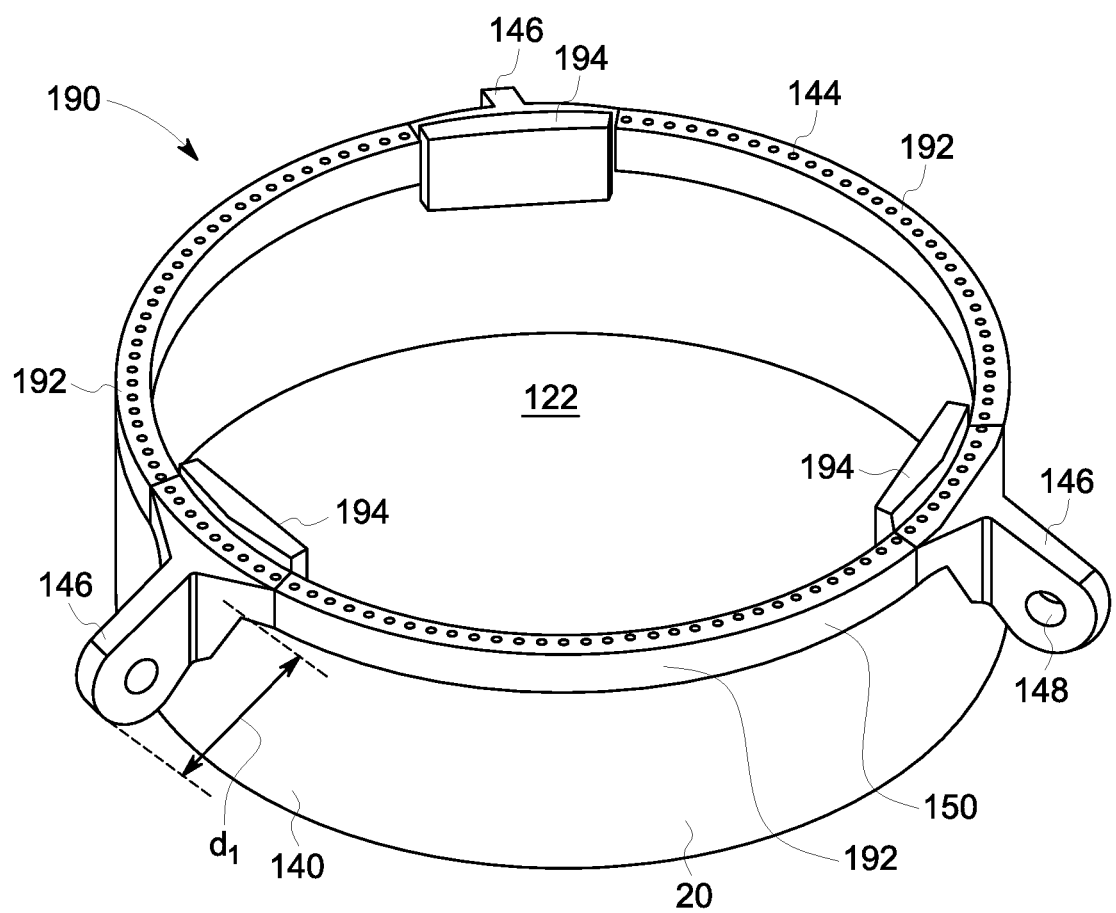
FIG. 14 is a diagrammatic illustration of an embodiment of a segmented connector ring for use in the wind turbine system disclosed herein, in accordance with one or more embodiments shown or described herein.

As previously noted, in each of the embodiments of FIGS. 1-7, the tensioned cables 30 are coupled to at least one connector ring 34, and more particularly, to an opening 148 formed in the pad eye adaptor 146. FIGS. 14-17 are provided as additional embodiments that may be employed in any of the previously described cable configurations for securing the tensioned cable 30 to the connector ring 34. As previously noted, like elements have like numbers throughout the embodiments. Referring more specifically to FIG. 14, illustrated is an embodiment of a connector ring 190, generally similar to connector ring 34, for use in any of the previously described embodiments of FIGS. 1-6. In the embodiment of FIG. 14, the connector ring 190 is segmented. More particularly, the connector ring 190 is comprised of a plurality of ring segments 192 and a plurality of pad eye adaptors 146 for disposing between adjacent flanges of the tower structure sections of the tower structure 20, as best described with regard to FIGS. 1 and 2. More specifically, in an embodiment, the connector ring 190 is disposed between adjacent flanges (not shown), generally similar to adjacent flanges 134, 136 of each of a tower structure section 138, 140, respectively, as previously described with respect to FIGS. 8 and 9. In this particular embodiment, the plurality of ring segments 192 include a plurality of openings 144 formed thereabout and cooperatively aligned with openings formed in the flanges 134, 136, as previously described. To provide for coupling of the connector ring 190 to the flanges 134, 136 of the tower structure 20, a bolt (not shown) or similar coupling component is disposed therein the openings.

The connector ring 190 includes a plurality of pad eye adaptors 146, each having an opening 148 formed therein. In contrast to the previous embodiments, each of the pad eye adaptors 146 is configured as a separate component disposed between adjacent ring segments 192 and configured extending a distance "$d_1$" from an outer perimeter 150 of the adjacent ring segments 192. In an alternate embodiment, for use in the interior located tensioned cables 30 as described in FIG. 7, the plurality of pad eye adaptors 146 may be formed extending into the interior space 122 (FIG. 7) of the connector ring. In the embodiment of FIG. 14, the pad eye adaptors 146 are configured in a downwardly angled configuration, wherein the plurality of openings 148 are vertically oriented, but again it is noted, the geometry of the connector ring 190 is design dependent relative to the coupling of the tensioned cables 30 therein the openings 148.

Figure 15:
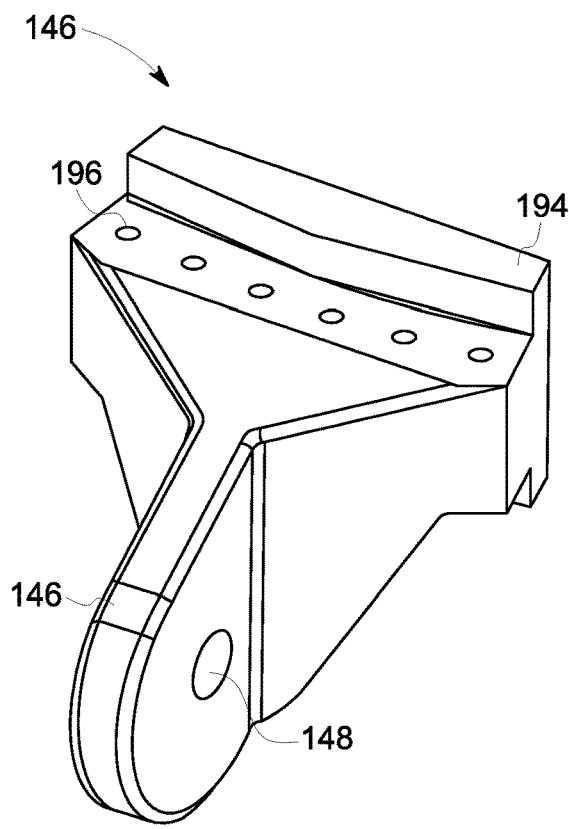
FIG. 15 is a diagrammatic illustration of a pad eye adaptor as a part of the segmented connector ring of FIG. 15, in accordance with one or more embodiments shown or described herein.

As previously described, in this particular embodiment the pad eye adaptors 146 are configured as separate components that are disposed between adjacent ring segments 192. In contrast to the previously disclosed embodiment, in this particular embodiment, as best illustrated in FIG. 15, the pad eye adaptors 146 include a back-side extension 194 that provides for load transfer to the back-side extensions 194. To provide coupling of the pad eye adapters 146 to the flanges 134, 136 of the tower structure 20, the pad eye adapters 146 may include openings 196, as illustrated in FIG. 15 and through which a coupling component, such as a bolt, may be positioned therethrough and in alignment with openings 142 in the flanges 134, 136.

Figure 16:
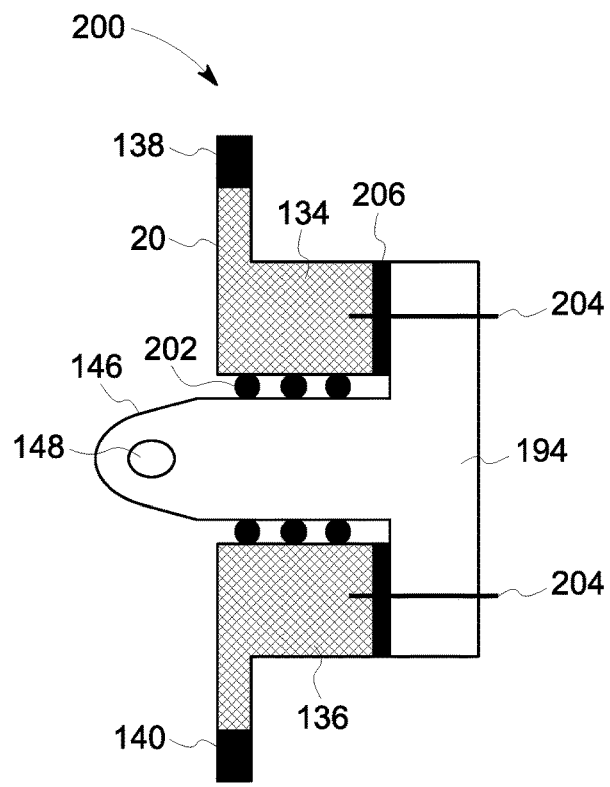
FIG. 16 is a diagrammatic illustration of a pad eye adaptor as a part of the segmented connector ring, in accordance with one or more embodiments shown or described herein.

In an alternate embodiment, a connector ring 200, as best illustrated in FIG. 16, comprises the pad eye adapter 146 positioned between the flanges 134, 136 and coupled to the flanges 134, 136 via one or more bolts 204, extending from the back-side extension 194 therethrough an optional gusset 206, for contact stress distribution, and into flanges 134, 136 of the tower structure 20. In the embodiment of FIG. 16, a plurality of cylindrical bearings 202 may be disposed between the pad eye adaptors 146 and the flanges 134, 146.

Referring now to FIG. 17, illustrated is another embodiment of a connector ring, generally similar to connector ring 34 of FIGS. 1-7. In this particular embodiment, illustrated is a connector ring 210. In contrast to the previously described embodiments, in this particular embodiment the connector ring 210 is configured to be disposed about an exterior of the tower structure 20. The connector ring 210 is typically disposed about the exterior surface of the tower structure 20 and proximate adjacent flanges of the tower structure sections. More specifically, and as best illustrated in FIG. 17, in an embodiment, the connector ring 210 is segmented, and more particularly configured in a plurality of sections 212 that are coupled together, such as with a plurality of bolts 214, or similar coupling components, about the tower structure 200. In the illustrated embodiment, the connector ring 210 is comprised of two hemispherical components. In a typical instance, the connector ring 210 is disposed proximate adjacent flanges, such as adjacent flanges 134, 136 of tower structure sections 138, 140 as previously described with regard to FIGS. 9-13. In this particular embodiment, the connector ring 210 is configured to include the plurality of sections 212, each including a plurality of pad eye adaptors 146 (of which three are illustrated), each having an opening 148 formed therein. In this particular embodiment the pad eye adaptors 146 are configured having an essentially any of the previously described geometries, but it is noted are design dependent relative to the coupling of the tensioned cables 30 therein the openings 148. In contrast to the previously described connector ring embodiments, the connector ring 210 described in FIG. 17 does not require any modification of tower structure during installation.

The above described wind turbine systems facilitate installation or repair of wind turbines using as much of the existing tower components and foundation as possible, eliminating limitations between tower and foundation due to larger loads, and provides for the use of potentially higher hubs therefore increasing annual energy production (AEP), while minimizing field work. The design of the wind turbine system in accordance with the present technique provides the use of taut cables in varying configurations, whereby the cables are coupled to a connector ring and optional knee members. Various configurations of the connector ring are disclosed. While only certain features of the embodiments have been illustrated and described herein, many modifications and changes will occur to those skilled in the art. It is, therefore, to be understood that the appended claims are intended to cover all such modifications and changes as fall within the true spirit of the invention.

While the invention has been described in terms of one or more particular embodiments, it is apparent that other forms could be adopted by one skilled in the art. This written description uses examples to disclose the invention, including the best mode, and also to enable any person skilled in the art to practice the invention, including making and using any devices or systems and performing any incorporated methods. Furthermore, the skilled artisan will recognize the interchangeability of various features from different embodiments. For example, various features described, as well as other known equivalents for each feature, may be mixed and matched by one of ordinary skill in this art to construct additional systems and techniques in accordance with principles of this disclosure. Of course, it is to be understood that not necessarily all such objects or advantages described above may be achieved in accordance with any particular embodiment. Thus, for example, those skilled in the art will recognize that the systems and techniques described herein may be embodied or carried out in a manner that achieves or optimizes one advantage or group of advantages as taught herein without necessarily achieving other objects or advantages as may be taught or suggested herein.

The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

The invention claimed is:

1. A wind turbine system comprising:
    a wind turbine generator comprising a tower structure mounted on a foundation structure, the tower structure including a plurality of tower sections, each of the plurality of tower sections including one or more tower section flanges having a plurality of fastener openings;
    one or more connector rings, each of the one or more connector rings including a singular radially extending portion about a circumference, the singular radially extending portion disposed between two adjacent tower section flanges and in contact with each of the two adjacent tower section flanges, each of the one or more connector rings including a plurality of openings through which a fastener is disposed coupling the singular radially extending portion of each of the one or more connector rings to the two adjacent tower section flanges the plurality of openings of the tower section flanges and the connector rings forming continuous openings and a plurality of pad eye adaptors having an opening formed therein, wherein each of the one or more connector rings comprises one of a non-segmented connector ring or a segmented connector ring; and
    a plurality of tensioned cables each coupled to one of the pad eye adaptors at a first end and the foundation structure at a second end,
    wherein the fastener serves as a load transfer mechanism.

2. The wind turbine system of claim 1, further comprising at least one knee member, wherein the plurality of tensioned cables are coupled to the one or more connector rings at a connection point above the at least one knee member.

3. The wind turbine system of claim 2, comprising a single knee member disposed proximate one of a tip of the tower structure or proximate a midpoint of the tower structure.

4. The wind turbine system of claim 2, comprising a first knee member disposed proximate a tip of the tower structure and a second knee member disposed proximate a midpoint of the tower structure, wherein the plurality of tensioned cables are coupled to the connector ring at a connection point above the first knee member.

5. The wind turbine system of claim 2, wherein the plurality of tensioned cables are configured in a crossed-cable configuration.

6. The wind turbine system of claim 1, wherein each of the plurality of tensioned cables are coupled to one of the pad eye adaptors, interior of the tower structure and in a crossed-cable configuration.

7. The wind turbine system of claim 1, wherein the one or more connector rings is disposed between two adjacent tower structure flanges.

8. The wind turbine system of claim 1, wherein each of the pad eye adaptors is configured in a downwardly angled position.

9. The wind turbine system of claim 1, wherein each of the pad eye adaptors is configured in one of a tear drop configuration, a straight configuration, a donut configuration and a mushroom configuration.

10. The wind turbine system of claim 1, wherein each of the plurality of pad eye adaptors is configured as a separate component that is coupled to the connector ring.

11. The wind turbine system of claim 1, wherein the one or more connector rings comprises a plurality of ring segments, and wherein each of the at least three pad eye adapters is disposed between adjacent ring segments of the plurality of ring segments.

12. The wind turbine system of claim 11, wherein each of the plurality of pad eye adapters comprises a back-side extension for load transfer.

13. The wind turbine system of claim 1, wherein the opening in each of the pad eye adaptors is configured as one of a horizontal opening or a vertical opening.

14. A wind turbine system comprising:
    a wind turbine generator comprising a tower structure mounted on a foundation structure, the tower structure including a plurality of tower sections, each including one or more tower section flanges;
    one or more connector rings, each of the one or more connector rings disposed proximate two adjacent tower section flanges one, each of the one or more connector rings including a plurality of pad eye adaptors having an opening formed therein, wherein each of the one or more connector rings comprises one of a non-segmented connector ring and a segmented connector ring;
    a plurality of tensioned cables each coupled to one of the plurality of pad eye adaptors at a first end and to the foundation structure at a second end; and
    at least one knee member, wherein the plurality of tensioned cables are coupled to the at least one knee member and to one of the plurality of pad eye adaptors at a connection point above the at least one knee member.

15. The wind turbine system of claim 14, wherein the one or more connector rings are disposed one of between two adjacent tower structure flanges or about an exterior surface of the tower structure.

16. The wind turbine system of claim 14, comprising a single knee member disposed proximate one of a tip of the tower structure and a midpoint of the tower structure.

17. The wind turbine system of claim 14, comprising a first knee member disposed proximate a tip of the tower structure and a second knee member disposed proximate a midpoint of the tower structure, wherein the plurality of tensioned cables are coupled to the one or more connector rings at a connection point above the first knee member.

18. The wind turbine system of claim 14, wherein the plurality of tensioned cables are configured in a crossed-cable configuration.

19. The wind turbine system of claim 14, wherein each of the plurality of tensioned cables are coupled to one of the pad eye adaptors, interior of the tower structure and in a crossed-cable configuration.

20. The wind turbine system of claim 14, wherein each of the pad eye adaptors is configured in one of a tear drop configuration, a straight configuration, a donut configuration and a mushroom configuration.

21. The wind turbine system of claim 14, wherein each of the plurality of pad eye adapters comprises a back-side extension for load transfer.

22. A method of stabilizing a wind turbine system, comprising:
    mounting a tower structure on a foundation structure, the tower structure including a plurality of tower sections, each of the plurality of tower sections including one or more tower section flanges having a plurality of fastener openings;
    securing a plurality of tensioned cables to one or more connector rings including a singular radially extending portion about a circumference, the singular radially extending portion disposed between two adjacent tower section flanges and in contact with each of the two adjacent tower section flanges, each of the one or more connector rings including a plurality of openings through which a fastener is disposed coupling each of the one or more connector rings to the two adjacent tower section flanges the plurality of openings of the tower section flanges and the connector rings forming continuous openings and a plurality of pad eye adaptors having an opening formed therein, wherein each of the one or more connector rings comprises one of a non-segmented connector ring or a segmented connector ring, and wherein the fastener serves as a load transfer mechanism;

securing the plurality of tensioned cables to the foundation structure; and mounting a wind turbine generator upon the tower structure.

23. The method of claim 22, further comprising securing the plurality of tensioned cables at different or multiple connector ring heights to yield a desired lateral stability.

* * * * *